US008288467B2

(12) United States Patent
Wilson, III (10) Patent No.: US 8,288,467 B2
(45) Date of Patent: Oct. 16, 2012

(54) ZINC IONOMER RUBBER ACTIVATOR

(75) Inventor: Thomas W. Wilson, III, Taichung (TW)

(73) Assignee: Nike, Inc., Beaverton, OR (US)

( * ) Notice: Subject to any disclaimer, the term of this patent is extended or adjusted under 35 U.S.C. 154(b) by 274 days.

(21) Appl. No.: 12/628,743

(22) Filed: Dec. 1, 2009

(65) Prior Publication Data

US 2010/0139128 A1    Jun. 10, 2010

Related U.S. Application Data

(60) Provisional application No. 61/120,728, filed on Dec. 8, 2008.

(51) Int. Cl.
*A43B 13/04* (2006.01)
*C08L 9/00* (2006.01)

(52) U.S. Cl. ......... 524/451; 524/504; 524/522; 524/572

(58) Field of Classification Search .................. 524/451, 524/504, 522, 572
See application file for complete search history.

(56) References Cited

U.S. PATENT DOCUMENTS

| 3,264,272 A | 8/1966 | Rees |
| 3,913,209 A * | 10/1975 | Sommer, Jr. ............. 29/451 |
| 4,526,375 A * | 7/1985 | Nakade ................ 473/385 |
| 4,661,554 A | 4/1987 | Coran et al. |
| 4,945,005 A * | 7/1990 | Aleckner et al. ......... 428/500 |
| 5,302,315 A | 4/1994 | Umland |
| 5,700,890 A | 12/1997 | Chou |
| 6,046,280 A | 4/2000 | Datta et al. |
| 6,207,761 B1 | 3/2001 | Smith et al. |
| 7,015,284 B2 | 3/2006 | Ajbani et al. |
| 7,045,577 B2 | 5/2006 | Wilkes et al. |
| 7,148,279 B2 | 12/2006 | Voorheis et al. |
| 7,186,768 B2 | 3/2007 | Korth et al. |

FOREIGN PATENT DOCUMENTS

| EP | 0031709 | 7/1981 |
| EP | 1953202 | 8/2008 |
| JP | 2005220251 | 8/2005 |

OTHER PUBLICATIONS

Grady et al, "Morphlogy of Zinc-Neutralized Maleated Ethylene—Propylene Copolymer Ionomers: Structure of the Ionic Aggregates as Studied by X-ray Absorption Spectroscopy", Macromoledules 2004, 37, pp. 8585-8591.

Grady, Brian P., "Review and Critical Analysis of the Morphology of Random Ionomers Across Many Length Scales", Polymer Engineering and Science, 2008 Society of OPlastic Engineers, pp. 1029-1051.

Heideman et al., "Various routes for reduction of zinc oxide levels in rubber compounds", Tire Technology International, 2004, pp. 22-27.

* cited by examiner

*Primary Examiner* — Robert D. Harlan
(74) *Attorney, Agent, or Firm* — Harness, Dickey & Pierce P.L.C.

(57) ABSTRACT

Curable rubber compositions and cured articles are based on the use of zinc activator compositions for the sulfur cure. Activator compositions contain zinc and a polymeric component having a plurality of COOH groups, at least some of which are neutralized with the zinc. With polymeric zinc activators, sulfur cure can be activated at levels of zinc below those used in conventional systems.

14 Claims, 2 Drawing Sheets

ZINC IONOMER RUBBER ACTIVATOR

INTRODUCTION

Synthetic and natural rubbers have a variety of unique and useful physical properties. In an uncured or natural state, such materials generally exhibit properties that are less than optimal for everyday or industrial use. Accordingly, rubber compositions are generally reacted with crosslinkers such as those containing sulfur or peroxide in order to cure the rubber to produce industrial articles having acceptable properties. In general, heat is applied to a rubber composition during a molding operation to produce molded articles having desired physical properties.

For many reasons, it is often desirable to increase the rate of cure in such molding operations. If the cure rate can be increased, articles can be molded for shorter times or they can be molded for the same time at lower temperatures. In either instance, a process is generally more cost effective if the rate of cure is faster. Over the years, a variety of additives has been developed that can be added to rubber compositions to generally increase the cure rate. Examples of such additives include the well-known sulfenamide accelerators. Using the known accelerators, rubber compositions can be formulated having a wide range of cure rates. In general, it would be desirable to provide rubber compositions having even greater cure rates so as to achieve the benefits noted above.

Zinc oxide (ZnO), as well as other divalent metal oxides such as CaO and MgO, is commonly referred to as an activator for the cure of rubber compounds containing accelerators, especially those containing sulfur. More precisely, one molecule of cationic component (e.g. ZnO) combines with two molecules of a fatty acid such as stearic acid ($C_{17}H_{35}COOH$) to form a salt or soap such as zinc stearate ($Zn(C_{17}H_{35}COO)_2$) and water. The soap (e.g., the zinc stearate) is believed to be the activator for cure.

During mixing and/or cure, the ZnO (or other cationic component) and fatty acid react to form the soap, which activates the sulfur cure. In actual practice, a stoichiometric excess of the cationic component to fatty acid is employed in the rubber compounds to obtain sufficient activation.

The excess of cationic component such as ZnO in the cured rubber tends to weaken the physical properties of the cured rubber. Additionally, zinc tends to leach out of cured rubber compositions over time, which could lead to concerns over contamination.

In light of the situation, it would be desirable to provide methods and compositions for curing rubber that have low levels of zinc, yet which still give acceptable cure kinetics and physical properties in the resulting cured articles.

SUMMARY

This section provides a general summary of the disclosure, and is not a comprehensive disclosure of its full scope or all of its features.

Curable rubber compositions and cured articles made from the compositions are provided based in part on the discovery of zinc activator compositions for the sulfur cure. In general, the activator compositions contain zinc and a polymeric component having a plurality of COOH groups, at least some of which are neutralized with the zinc. Although the invention is not limited by theory, it is believed that the polymeric zinc activators activate the sulfur cure by a mechanism similar to that of the classic zinc stearate activators known in the art. It has now been discovered that when polymeric zinc activators according to the invention are used, rubber cure by sulfur crosslinking systems can be activated using a total concentration of zinc that is well below that used in conventional zinc stearate systems, especially those with any filler that has active hydrogens on its surface, e.g. ~Si—OH on the surface of silica fillers.

In one aspect, curable compositions contain polymeric activators containing zinc neutralized carboxyl groups. The invention further provides methods of curing the rubber compounds and the cured articles made from them. In other aspects, the curable compositions contain a source of zinc such as zinc oxide as well as carboxylic polymers that contain a plurality of COOH groups. The invention provides methods of mixing the zinc and carboxylic polymer separately to form a curable rubber composition with good activation. It is believed that when the zinc and the carboxylic acid polymer are provided separately and pre-mixed in this way, an active ingredient like the partially zinc neutralized carboxylic polymer is formed in situ. Once the activating system is formed, either by direct addition to a composition containing a curable rubber or by in situ formation, the rubber compositions are further compounded and subjected to curing conditions.

A variety of rubber articles can be made using the zinc activation system described herein. The cured articles can contain a variety of fillers, such as silica and carbon black. Silica-filled rubbers of the invention find use, for example, as rubber soles for shoes, while filled carbon black compositions can be used in tires.

Further areas of applicability will become apparent from the description provided herein. The description and specific examples in this summary are intended for purposes of illustration only and are not intended to limit the scope of the present disclosure.

DESCRIPTION

Curable rubber compositions contain zinc activator components. The activator components comprise a zinc part and a carboxylic polymer part. The carboxylic polymer is generally a polymeric material that contains a plurality of COOH groups, either on the backbone of the polymer or grafted onto the backbone. In various embodiments, the activator component is described and presented as a polymer containing a plurality of COOH groups, wherein at least a portion of the COOH groups are neutralized with at least one metal that can activate the cure of the rubber resins. In other embodiments, the activator component is described as one comprising a polymer with a plurality of zinc carboxylate groups. In other embodiments, the activator component is characterized as a zinc ionomer. As further discussed herein, the zinc activator component can be provided into a rubber composition in a pre-formed fashion, or can be generated in situ from a zinc source and a carboxylic polymer source.

In various embodiments, the activator component comprises a second metal that is compatible with and enhances the activation by the zinc. Preferably, these secondary metals are also divalent like zinc. Preferred metals include magnesium and calcium.

In various aspects, the invention provides moldable rubber compositions, methods for curing the molded rubber compositions, and cured articles made by the process of curing the compositions. Molded articles find use as rubber soles of shoes, as automotive tires, and in a wide variety of other uses.

In one embodiment, a moldable rubber composition contains a rubber resin, a curing system for the rubber resin, a filler component, and an activator. The rubber resin is selected from natural rubber and synthetic rubber, while the activator comprises a polymer that contains a plurality of COOH groups, wherein at least a portion of the COOH groups are neutralized with at least one metal that can activate cure of the rubber resin. In preferred embodiments, the at least one metal that can activate cure of the rubber resin includes zinc, particularly when it is present as the $Zn^{+2}$ ion. In various further embodiments, the composition further comprises calcium or magnesium.

In various embodiments described herein, the curing system for the rubber resin comprises sulfur and the activator comprises a polymer with a plurality of COOH groups, wherein at least a portion of the COOH groups are neutralized with zinc.

In this and other embodiments described herein, the filler component can be selected from a variety of substances such as, for example, silica and carbon black.

In another embodiment, a moldable rubber composition is characterized as containing a rubber resin, a sulfur-containing curing system for the rubber, a filler, and an activator for sulfur cure of the rubber wherein the activator comprises a polymer with a plurality of zinc carboxylate groups. As in other embodiments, the rubber resin can be selected from natural rubber and also from synthetic rubbers that can be sulfur cured.

In another embodiment, a moldable rubber composition is characterized by containing rubber, a sulfur cure system for the rubber, a filler, and an activator component comprising a zinc ionomer. As used herein, a zinc ionomer is a term of art used to describe and characterize polymers containing carboxylate groups on the main chain or pendant from the main chain, and wherein groups of carboxylate groups are associated with zinc ions in such a way as to form an ionic cluster. The ionic clusters act like thermally labile crosslinks.

In other embodiments, methods of curing a rubber composition involve heating compositions described herein under time and temperature conditions sufficient to provide a cured article. As described further herein, in various embodiments, moldable rubber compositions are cured for a total time of T90, T90+1 minutes, T90+2 minutes, and so forth. The temperature of curing is selected so that activation and cure of the rubber resin takes place in a commercially reasonable amount of time.

Molded articles made by curing the moldable rubber compositions of the invention include tires, rubber soles for shoes, and the like.

In another aspect, a zinc activator component is formed in situ during the mixing of the other components of the moldable rubber compositions. Thus, in one embodiment, a rubber composition contains a natural or synthetic rubber, a polymeric material containing a plurality of COOH groups, a $Zn^{+2}$ compound, and a filler. In various embodiments of the invention, such a rubber composition is first compounded, blended, or masticated for a sufficient time and at a suitable temperature for the zinc compound to react with the polymer to form a zinc activator component in situ that comprises a polymeric material containing a plurality of zinc carboxylate groups. Before, while, or after the activator complex is formed in situ by blending the above composition, one or all of the components of the sulfur-curing system for the rubber resin is added. Once the sulfur-curing system and the activator complex are present in the composition containing the curable rubber, the resulting composition is further blended for a suitable time, preferably at a temperature at which the rubber does not significantly cure. The result of the process is a moldable rubber composition that can be made into rubber soles, tires and the like by molding the rubber composition and subjecting it to curing conditions of time and temperature.

Thus, in various embodiments, a method of making a cured rubber composition involves the steps of heating a moldable rubber composition for a suitable time at a suitable temperature, wherein the composition comprises a rubber resin selected from natural rubber and synthetic rubber, a sulfur-curing system for the rubber, a rubber cure activator component comprising a polymer with one or more carboxylate groups, and further containing 0.01-0.5 wt. % Zn an elemental basis. The zinc is believed to present at least in part in close association with the carboxylate groups. As already noted, the 0.01-0.5 wt. % Zn on an elemental basis can be provided in the compositions by in situ formation of a polymeric zinc activator, or by the use of commercial polymeric materials containing zinc carboxylates as activator component. Advantageously, the compositions contain a lower total level of Zn than conventional zinc stearate activated compositions.

In various other embodiments, methods of making a moldable rubber composition involve the steps of applying mechanical energy to a rubber composition to mix the components. In the first step where mechanical energy is applied, the rubber compositions contain in a non-limiting embodiment a natural or synthetic rubber resin, a polymer containing a plurality of COOH groups, a compound that is a source of $Zn^{+2}$ ion, and a filler. After the above components are mixed, a sulfur curative system for the rubber is added and the components mixed for a further time at a temperature below one at which the rubber cures significantly. Thereafter, the mixing is stopped and the mixture is allowed to cool. The cooled blend is then ready to be molded and cured to provide a variety of cured rubber articles as described further herein.

Further non-limiting description of components of the moldable rubber compositions is now provided. Unless the context requires otherwise, it is understood that components described for illustrative purposes in one embodiment can also be used in others.

Rubber Resins

The rubber compositions of the invention contain natural or synthetic rubber, or mixtures of rubbers, as well as conventional rubber additives such as curing agents and accelerators.

In general, any rubber that can be crosslinked by a sulfur cure can be used to make the compositions of the invention. Sulfur cured describes the vulcanization process typical of making rubber. Mixtures of rubbers may also be used. Examples of rubbers useful in the invention include, without limitation, natural rubber such as those based on polyisoprene.

Synthetic rubbers may also be used in the invention. Examples include, without limitation, synthetic polyisoprenes, polybutadienes, acrylonitrile butadiene rubber, styrene acrylonitrile butadiene rubber, polychloroprene rubber, styrene-butadiene copolymer rubber, isoprene-isobutylene copolymer rubber and its halogenated derivatives, ethylene-propylene-diene copolymer rubbers such as ethylene-propylene-cyclopentadiene terpolymer, ethylene-propylene-5-ethylidene-norbornene terpolymer, and ethylene-propylene-1,4-hexadiene terpolymer, butadiene-propylene copolymer rubber, butadiene-ethylene copolymer rubber, butadiene-isoprene copolymer, polypentenamer, styrene-butadiene-styrene block copolymers, epoxidized natural rubber and their mixtures. In general, such compounds are characterized by repeating olefinic unsaturation in the backbone of the polymer, which generally arises from the presence of butadiene or isoprene monomers in the polymer structure.

Sulfur Curing Agents

Conventional sulfur based curing agents may be used in the compositions of the invention. Such curing agents are well known in the art and include elemental sulfur as well as a variety of organic sulfide, disulfide and polysulfide compounds. Examples include, without limitation, vulcanizing agents such as morpholine disulfide, 2-(4'-morpholinodithio) benzothiazole, and thiuram compounds such as tetramethylthiuram disulfide, tetraethylthiuram disulfide and dipentamethylenethiuram tetrasulfide. The vulcanizing agents may be used alone or in combination with each other. In a preferred embodiment, sulfur is used as the curing agent.

Accelerators

The rubber compositions of the invention also in general contain accelerators. Such accelerators and co-accelerators are known in the art and include without limitation, those based on dithiocarbamate, thiazole, amines, guanidines, xanthates, thioureas, thiurams, dithiophosphates, and sulfenamides. Non-limiting examples of accelerators include: zinc diisobutyldithiocarbamate, zinc salt of 2-mercaptobenzothiazole, hexamethylenetetramine, 1,3-diphenyl guanidine, zinc isopropyl xanthate, trimethyl thiourea, tetrabenzyl thiuram disulfide, zinc-O-, O-di-n-butylphosphorodithiolate, and N-t-butyl-2-benzothiazole sulfenamide.

Another accelerator suitable for use is a class of xanthogen polysulfides such as dialkyl xanthogen polysulfide. A non-limiting example of a dialkyl xanthogen polysulfide is diisopropyl xanthogen polysulfide, such as is commercially available as Robac AS-100, supplied by Robac Chemicals. Advantageously, Robac AS-100 is free of nitrogen, phosphorus, and metallic elements. It is recommended for use as an accelerator in vulcanization of natural rubber, synthetic polyisoprene, nitrile rubber, etc. where the formation of N-nitrosamines and type-4 allergens is of prime concern. The dialkyl xanthogen polysulfides also act as a sulfur donor.

In various embodiments, the dialkyl xanthogen polysulfide accelerators show synergism with other accelerators, for example, zinc dibenzyl dithiocarbamate or tetrabenzyl thiuram disulfide (TBzTD), whether in the presence or absence of elemental sulfur. The xanthogen polysulfides also produce effective cure in the presence of thiazoles and sulfenamides. For example, a combination of the xanthogen polysulfide and a sulfenamide, such as N-t-butyl-2-benzothiazole sulfenamide (TBBS), is an effective accelerator system that functions in the absence of elemental sulfur. The xanthogen polysulfide accelerators can also be used in combination with other soluble sulfur donors. Typical treatment levels with the xanthogen polysulfide as accelerator are from 0.1-10 PHR, and are advantageously 5 PHR or less, or 2 PHR or less. In a non-limiting example, a xanthogen polysulfide accelerator compound is used at about 0.6 PHR.

The sulfur based curing agents and accelerators together make up a sulfur curing system. Normally, both the curing agent (source of sulfur, including soluble and insoluble sulfur, and including organic and inorganic sulfur) and the accelerator should be present before carrying out the rubber curing reactions described herein.

In various embodiments, the rubber compositions of the invention contain an accelerator selected from the class of titanium or zirconium compounds. Such accelerators are described in U.S. Pat. No. 6,620,871, the disclosure of which is incorporated by reference. The zirconium or titanium compounds can be characterized as those that contain a alkoxy group —OR bonded respectively to titanium or zirconium. Mixtures of the zirconium and titanium compounds may also be used. Generally, the R group of the alkoxy group is an alkyl group having 8 or fewer carbon atoms. In a preferred embodiment, the R group contains 6 or fewer carbons, and more preferably contains 4 or fewer carbon atoms. Examples of alkyl groups containing 4 or fewer carbon atoms include methyl, ethyl, n-propyl, isopropyl, n-butyl, isobutyl, sec-butyl, and t-butyl.

In a preferred embodiment, the titanium or zirconium compound has 2 alkoxy groups bonded to the titanium or zirconium. In another preferred embodiment, there are 4 alkoxy groups —OR bonded to the central titanium or zirconium atom where R is as described above. Based on the above, there are several forms of the titanium and zirconium compounds. Preferred compounds include the tetraalkyl (those having four alkoxy groups bonded to the metal) and the chelate forms. A class of compounds that has shown good utility is the chelates. Chelates, in general, are those titanium or zirconium compounds that are complexed with an organic ligand system that contains two atoms or functional groups capable of forming covalent or dative bonds to the central titanium or zirconium compound. Generally, the atoms or functional groups that form covalent or dative bonds to the central atom are those that are highly electronegative and include oxygen, nitrogen, and sulfur. The two atoms or functional groups providing the ligand to the central titanium and zirconium atoms may be the same or different. In a preferred embodiment, the atoms bonded to the central titanium or zirconium atom through the chelate are oxygen. Examples of chelating ligands include, without limitation, acetylacetonate, ethyl acetylacetonate, triethanolamine, lactic acid and its salts such as the ammonium salt, glycolic acid and its salts, and esters of citric acid, such as diethyl citrate. A well known chelate useful in the invention is the titanium acetylacetonate chelate compound illustrated by the following formula.

Where R comprises an alkyl group of 8 carbons or less, preferably 6 carbons or less, and more preferably 4 carbons or less. Here the chelate contains two alkoxy groups OR and a central titanium atom on which two acetylacetonate groups are chelated. It can be seen that the titanium atom, the two dative bonding groups on the chelate molecule, and the atoms bridging the two dative bonding groups form a six membered ring. In general, chelates of the invention include those that form from a five to an eight membered ring with the titanium atom and the two dative bonding groups of the chelating ligand. In the figure, the R groups are as described above. In a preferred embodiment, the R groups in the figure are isopropyl. Other chelates may be used in the rubber compositions of the invention. The above figure is provided for illustration only. In other preferred embodiments, other chelating ligands such as triethanolamine, lactic acid ammonium salt, diethyl citrate, and ethyl acetylacetonate are used. It is also possible to substitute zirconium for titanium in the structure illustrated above.

The zirconium or titanium chelates are generally highly colored, ranging from yellow to a dark red. This generally provides no problems if the chelate compounds are to be formulated into black rubber compositions. On the other hand, if white or lightly colored rubber compositions are to be formulated, then tetraalkyl and polymeric forms of the titanium and zirconium compounds are preferred, as they are not as deeply colored.

In various embodiments, the compositions contain an effective amount of the titanium or zirconium compound. Generally, the compositions will have from about 0.01 parts to about 10 parts per hundred parts of rubber resin (phr) of the titanium or zirconium compound. Depending on the variety of rubber, and additives such as accelerators and fillers, formulations can be compounded at amounts ranging from about 0.1 to about 5 phr by weight of the titanium or zirconium compound. Generally, the compounds are available in as supplied form from about 70% to greater than 98% active.

In a preferred embodiment, the titanium or zirconium compounds have four alkoxy groups. For a titanium compound, the general structure can be represented by the formula where the structure depicted is a tetraalkyl titanate. For a zirconium compound, the formula is the same except that zirconium is substituted for titanium as the central atom. The organic side chains can be represented by $R_1$, $R_2$, $R_3$, and $R_4$. In general, $R_1$, $R_2$, $R_3$, and $R_4$ can be the same or different. When the R groups are identical it is common to depict the tetraalkyl titanate by the general formula $Ti(OR)_4$. An example of a tetraalkyl titanate where all the R groups are identical is tetra n-butyl titanate. In the formula, the titanium has 4 alkoxy groups OR wherein R is an alkyl group of 8 carbons or less. Preferably R is an alkyl group of 6 carbons or less. In a preferred embodiment, the alkyl groups are of 4 carbons or less as discussed above for the chelates. It appears that the length of the pendant organic group determines the effectiveness of the titanium or zirconium compound to reduce the cure temperature of rubber compositions or the invention. Without being bound by theory, it is believed that the lower molecular weight side chains such as those containing 8 carbons or less and preferably 6 carbons or less and more preferably 4 carbons or less, will cause the titanium or zirconium compound to break down at relatively lower temperatures and hence produce their catalytic effect. As the molecular weight of the pendant organic groups increases, the compound in generally becomes more thermally stable and is less capable of having a catalytic effect on cure.

Another sub-class of titanium or zirconium compounds is the polymeric titanates or zirconates. The titanates can be represented by the general structure where x represents the degree of polymerization. The zirconates are like the titanates, with zirconium substituted for titanium. Such polymeric titanate materials can be made by condensing a tetraalkyl titanate, as described for example in U.S. Pat. No. 2,621,193. The analogous polymeric zirconates can be synthesized by the procedure outlined for the polymeric titanates. The R group in the alkoxy group —OR in the formula above is defined as for the chelates and for the tetraalkyl titanates.

Titanium and zirconium compounds are commercially available for example from DuPont under the Tyzor® trade name. One example is Tyzor AA-75, which is a 75% solution in isopropanol of the titanium diisopropyl acetylacetonate given in Table 1. Another is Tyzor® BTP, which is poly n-butyl titanate.

It may be desirable to protect the titanium and/or zirconium compounds from hydrolysis during use. In general, it is observed that the tetraalkyl zirconates and titanates tend to have a higher rate of hydrolysis than the chelate compounds. The susceptibility to hydrolysis increases as the size of the R group on the alkoxy group —OR decreases. The zirconium compounds tend to be more sensitive than the titanium compounds to moisture. When susceptibility to hydrolysis of the compounds of the invention is a concern, it has been found useful to provide the zirconium or titanium compounds of the invention as auxiliary compositions in the form of masterbatches. To make the masterbatches, the zirconium or titanium compound is admixed with a hydrophobic material that protects it from moisture. In a preferred embodiment, the hydrophobic compound comprises a petroleum wax. When the zirconium compound or titanium compound is provided in liquid form, it is often desirable to add a carrier to the composition to bind the zirconium or titanium compound. A commonly used carrier is silica. When dark colored or black rubber compositions are to be formulated it is possible to use carbon black as a carrier. When light colored or white formulas are to be made, it is possible to use titanium dioxide as a carrier to make the masterbatches of the invention. As an example, a masterbatch was formulated from the liquid tetra n-propyl zirconate by the following procedure. First, 30 grams of silica were weighed out. The silica was heated at 175° C. for 20 minutes and allowed to cool in an oven to less than 100° C. The silica lost 1.8 grams of weight during heating due to evaporation of water. Next, Okerin 1956 was heated to melting. Okerin 1956 is a petroleum wax. A 70% solution of tetra n-propyl zirconate in n-propanol, 63 g, was added to the silica and stirred to make a paste. Then 39 grams of the molten Okerin 1956 petroleum wax was stirred onto the silica paste and stirred to combine. The mixture was allowed to cool slightly and sealed in a plastic bag. The masterbatch uses a petroleum wax, Okerin 1956, to protect the zirconate from moisture. The silica acts as a convenient carrier to bind the liquid zirconate. The zirconate masterbatch was used in several formulations and compared to the previous studies where only the liquid form was used. In principle, it was observed that the masterbatch did protect the zirconate from decomposition by water. It was observed that the cure time of a rubber composition containing as a component the zirconate masterbatch was reduced at a specific temperature when compared to the rubber composition made by using the liquid zirconate.

Rubber Compounding

The rubber compositions of the invention can be compounded in conventional rubber processing equipment. In a typical procedure, all components of the rubber composition are weighed out. The rubber and additives are then compounded in a conventional mixer such as a Banbury mixer. If desired, the compounded rubber may then be further mixed on a roller mill. At this time, it is possible to add pigments such as carbon black. The composition may be allowed to mature for a period of hours prior to the addition of sulfur and accelerators, or they may be added immediately on the roller mill. It has been found to be advantageous to add the accelerators into the Banbury mixer in the later stages of the mixing cycle. Adding the accelerators into the Banbury mixer generally improves their distribution in the rubber composition, and aids in the reduction of the cure time and temperatures that is observed in the compositions of the invention. In general, the elemental sulfur curing compound is not added into the Banbury mixer. Organic sulfides (sulfur donating compounds) may be added to the Banbury mixer.

Rubber Cure Activators

The activator component, in various embodiments, contains a carboxylic functional base copolymer (also referred to as a "carboxylic polymer") and zinc. It is believed that, in the activator composition, the zinc is incorporated into the base polymer by being associated with the carboxylic acid groups of the polymer such as by neutralization. As noted, there are several zinc incorporated carboxylic-based polymers that are commercially available. These commercially available zinc-neutralized polymers can be incorporated as the activator component. Alternatively, a carboxylic base polymer and a source of zinc can be combined as described herein to form the activator complex in situ.

In one embodiment, the base copolymer is a polymer of an α-olefin and an α,β-ethylenically unsaturated carboxylic acid. The α-olefin has a general formula $RCH=CH_2$, where R is a radical selected from hydrogen and alkyl radicals having from 1-8 carbon atoms. The α,β-ethylenically unsaturated carboxylic acid has 1 or 2 carboxylic acid groups and is also referred to as a carboxylic acid monomer. In various embodiments, the olefin content of the polymer is at least 50 mol %, while the acid monomer content of the polymer is generally from about 0.2-50 mol % and is 0.2-25 mol % in various embodiments. In the active component, the quantity of zinc metal ion is generally sufficient to neutralize at least about 10 percent of the carboxylic acid groups in the base polymer. In some embodiments, it is preferred to avoid complete neutralization of all the carboxylic groups by zinc.

Suitable olefins for forming the base copolymer include ethylene, propylene, 1-butene, 1-pentene, 1-hexene, 1-heptene, 3-methylbutene, 3-methyl-1-butene, 4-methyl-1-pentene, and so on. Non-limiting examples of α,β-ethylenically unsaturated carboxylic group containing monomers include those having 3-8 carbon atoms. Examples include acrylic acid, methacrylic acid, ethyl acrylic acid, itaconic acid, maleic acid, fumaric acid, as well as monoesters of dicarboxylic acids, such as methyl hydrogen maleate, methyl hydrogen fumarate, ethyl hydrogen fumarate, maleic anhydride, and so on. For purposes of the description of the base copolymers, maleic anhydride is considered to be a carboxylic acid group containing monomer because its chemical reactivity is that of carboxylic acid groups. Similarly, other α,β-ethylenically unsaturated anhydrides of carboxylic acids can be used. The concentration of the acidic monomer and copolymer is from 0.2% mol-50% mol, preferably from about 1-10% mol %.

The base copolymers can be prepared in a number of ways. In one example, the copolymers can be obtained by copolymerizing a mixture of the olefin and the carboxylic acid monomer. In other embodiments, copolymers of α-olefins and α,β-ethylenically unsaturated carboxylic acid can be prepared by copolymerizing the olefin with an unsaturated carboxylic acid derivative, which subsequently or during copolymerization is reacted completely or in part to form the free acid. Thus, hydrolysis, saponification, or pyrolysis can be employed to form an acid copolymer (i.e., a carboxylic functional base copolymer) from an ester copolymer.

Other monomers besides the olefin monomer and carboxylic acid monomer can be used to form the base copolymer. Non-limiting examples of base copolymers include: Ethylene/acrylic acid copolymers, ethylene/methacrylic acid copolymers, ethylene/itaconic acid copolymers, ethylene/methyl hydrogen maleate copolymers, ethylene/maleic acid copolymers, ethylene/acrylic acid/methyl methacrylate copolymers, ethylene/methacrylic acid/ethyl acrylate copolymers, ethylene/itaconic acid/methyl methacrylate copolymers, ethylene/methyl hydrogen maleate/ethyl acrylate copolymers, ethylene/methacrylic acid/vinyl acetate copolymers, ethylene/acrylic acid/vinyl alcohol copolymers, ethylene/propylene/acrylic acid copolymers, ethylene/styrene/acrylic acid copolymers, ethylene/methacrylic acid/acrylonitrile copolymers, ethylene/fumaric acid/vinyl methyl ether copolymers, ethylene/vinyl chloride/acrylic acid copolymers, ethylene/vinylidene chloride/acrylic acid copolymers, ethylene/vinyl fluoride/methacrylic acid copolymers, ethylene/chlorotrifluoroethylene/methacrylic acid copolymers and carboxylated rubbers such as carboxylated acrylonitrile-butadiene rubber (XNBR) and hydrogenated carboxylated acrylonitrile-butadiene rubber (HXNBR).

The zinc-containing polymeric activator components of the present invention are obtained by the reaction of the copolymer base with an ionizable zinc compound. The reaction is referred to as neutralization, and the activator components are described as containing a plurality of carboxylic groups neutralized by zinc. As noted, some zinc-containing activator components are available commercially, while others can be prepared in situ from a zinc compound and a carboxylic functional base copolymer. Formation of the zinc-neutralized carboxylate groups during in situ production of the zinc activator complex can be followed, for example, with infrared spectroscopy. Activator components are selected that contain a suitable level of zinc in a carrier material comprising the carboxylic functional base copolymer. Normally, very high levels of zinc neutralization are avoided because the neutralized polymer tends to become intractable. On the other hand, when too small a percentage of the acid (i.e., carboxylic) groups is neutralized, the component does not provide sufficient zinc for activation. It has been found desirable to provide zinc activator components wherein about 5-50 percent of the acid groups have been neutralized. In keeping with the environmental goal to reduce zinc levels, one can preferably neutralize 5-20 percent of the acid groups.

Commercially available zinc activator components based on olefin carboxylic acid copolymers include those available under trade names such as Surlyn™ (DuPont), Amplify™ (Dow) and Iotek™ (ExxonMobil).

Other examples of an olefin carboxylic copolymer are terpolymers such as those available under the trade name Lotader™ from Arkema. A non-limiting example is a terpolymer of ethylene, an acrylic ester, and maleic anhydride.

In addition to carboxylic copolymers described above containing carboxylic groups pendant from the main chain, other suitable carboxylic polymers include those prepared by grafting maleic anhydride onto other copolymers. Suitable examples of these include those available under the trade name Orevac™ from Arkema.

Another class of base copolymers that can be combined with a zinc component to provide zinc carboxylate activator complex is the class of styrene maleic anhydride copolymers. A family of styrene maleic anhydride copolymers is commercially available, for example, from Sartomer, in the SMA™ series. In various embodiments, suitable base resins are commercially available that contain styrene/maleic anhydride ratios of 1:1, 2:1, 3:1, 4:1, 6:1, and 8:1. Ester resins are prepared by partial esterification of the base resins. The ester resins contain a combination of anhydride and monoester/monocarboxylic acid functionality. The commercial grades are conveniently available in flake or powder form. The number average molecular weight of various commercially available styrene-maleic anhydride copolymers and partial esters runs from about 2,000-12,000. An example of a partially esterified styrene maleic anhydride polymer is Sartomer SMA 3840. It is believed to be partially esterified with isooctanol.

The styrene maleic anhydride copolymers are available as a carboxylic-containing base polymer. In preferred embodiments, zinc-containing activator components are formed in situ by combining the styrene-maleic anhydride copolymers and partial esters with a zinc compound such as ZnO according to the methods described herein.

In addition to zinc, the rubber compositions can also contain other divalent metals that have been found to enhance the cure, sometimes in a synergistic fashion with the zinc. In various embodiments, the compositions further contain magnesium or calcium. Although not limited to theory, it is believed that rubber compositions containing Mg or Ca in addition to zinc contain the respective Mg and Ca in a form closely associated with carboxylic groups of the base copolymers, so as to form additional carboxylate groups on the polymers. The Mg- or Ca-containing activators can be formed in situ by combining suitable compounds such as MgO and CaO along with the zinc compounds in the methods described herein. The divalent Ca or Mg is generally added to the compositions herein as a compound or compounds comprising $Ca^{2+}$ or $Mg^{2+}$. Although potentially any such compound can be used, it is preferred to use the respective hydroxides ($Ca(OH)_2$ or $Mg(OH)_2$) or oxides (CaO or MgO).

Fillers

Fillers are used in rubber compositions to enhance properties, to save money, to facilitate processing, to improve physical properties or for other reasons. A variety of filler materials are known. Such fillers include silica, carbon black, clay, organic fiber, inorganic metal powder, mineral powder, talc, calcium sulfate, calcium silicate, and the like. Typical levels of these and other fillers include from about 10 phr to 100 phr or higher. In various embodiments, the compositions contain 10-80, 30-70, 40-60, 50-60, or 35-60 phr filler.

Silica is preferred in some embodiments. In preferred embodiments, the filler comprises a silica filler in an amount such as 10 to 100 phr. In further non-limiting embodiments, the compounds comprise 30 to 60 phr silica filler or 40 to 60 phr silica filler. Without limitation, typical compositions for use in preparing molded rubber outsoles for athletic shoes contain about 10 to about 60 phr filler.

Coupling Agents

The rubber compositions may also contain coupling agents, such as those based on silanes. When present, the silane coupling agents contribute to the stability and physical properties of the compositions, for example, by compatibilizing or coupling the reinforcing filler with the rubber components. Silane coupling agents include those with amino, epoxy, (meth)acryl, chloro, and vinyl functionality.

Examples of amino functional silane coupling agents include aminopropyltriethoxysilane; aminopropyltrimethoxysilane; aminopropylmethyldimethoxysilane; aminoethylaminopropyltrimethoxysilane; aminoethylaminopropyltriethoxysilane; aminoethylaminopropylmethyldimethoxysilane; diethylenetriaminopropyltrimethoxysilane; diethylenetriaminopropyltriethoxysilane; diethylenetriaminopropylmethyldimethoxysilane; diethylenetriaminopropylmethyldiethoxysilane; cyclohexylaminopropyltrimethoxysilane; hexanediaminomethyldiethoxysilane; anilinomethyltrimethoxysilane; anilinomethyltriethoxysilane; diethylaminomethyltriethoxysilane; (diethylaminoethyl)methyldiethoxysilane; and methylaminopropyltrimethoxysilane.

Examples of sulfur functional silane coupling agents include bis(triethoxysilylpropyl)tetrasulfide; bis(triethoxysilylpropyl)disulfide; bis (3-ethoxydimethylsilylpropyl) oligosulfur; mercaptopropyltrimethoxysilane; mercaptopropyltriethoxysilane; mercaptopropylmethyldimethoxysilane; 3-thiocyanatopropyltriethoxysilane; and bis(silatranylpropyl)polysulfide.

Examples of epoxy silane coupling agents include: glycidoxypropyltrimethoxysilane; glycidoxypropyltriethoxysilane; glycidoxypropylmethyldiethoxysilane; and glycidoxypropylmethyldimethoxysilane.

Examples of (meth)acryl silane coupling agents include: methacryloxypropyltrimethoxysilane; methacryloxypropyltriethoxysilane; and methacryloxypropylmethyldimethoxysilane.

Examples of chloro silane coupling agents include: chloropropyltrimethoxysilane; chloropropyltriethoxysilane; chloromethyltriethoxysilane; chloromethyltrimethoxysilane; and dichloromethyltriethoxysilane.

Examples of vinylyl silane coupling agents include: vinyltrimethoxysilane; vinyltriethoxysilane; and vinyltris(2-methoxyethoxy)silane.

Moldable rubber compositions contain other ingredients in addition to the rubbers, curatives, accelerators, and activators. These additives are well-known in the art and include processing aids, antioxidant packages, pigments, and the like. Non-limiting examples of specific uses of these additives are given in the examples.

Using the zinc ionomer activators described herein, it has been found that moldable rubber compositions can be cured to provide useful molded articles, even when they contain much less zinc than would be required for conventional zinc stearate activated systems. In various embodiments, the use of zinc in the moldable rubber compositions is at an order of magnitude less than that used with conventional zinc soap activation. The reduced level of zinc in the moldable rubber compositions and cured articles is believed to lead to a variety of advantages. Moldable rubber compositions with a lower level of zinc from use of the inventive zinc activators are cheaper than conventional rubbers even taking into account the extra expense of the base copolymers on which the zinc activators are based.

Because the compositions and cured articles contain less overall zinc, there is less leaching of zinc into the environment. It is believed that carboxylate groups of the base copolymers are tightly bound to the zinc ions and further limit the leaching of the zinc from the compositions. In various embodiments, this is borne out in measurements of total zinc and of so-called "leachable" zinc.

In a non-limiting example, total Zn analysis is carried out digesting the rubber following EPA Method 3050 (5-g sample, nitric acid+peroxide) and then analyzing for Zn by ICP (SW6010). The ICP method is Inductively coupled plasma atomic emission spectroscopy. Typical cured rubber compositions contain from about 0.01 to about 0.5% by weight of zinc determined in this way, reflecting a significant reduction of zinc levels over conventional rubber; more detail on zinc level is given below.

Leaching analysis for Zn is carried out following EPA method 1312 (SPLP, using pH=4.2 extraction fluid option) to leach the sample and then analyzing the leachate by ICP (SW6010) for Zn. Cured rubber compositions described herein are characterized by low levels of leached zinc, as reflected in the leaching analysis and ICP concentration determination. In various embodiments, the measured zinc leachate levels are <50 µg/L, <40 µg/L, <30 µg/L, <20 µg/L, <10 µg/L, or <5 µg/L according to the EPA methods (including ICP analysis of the leachate). Although the leachate levels are low, they are non-zero. Normally, the leachate zinc levels will be above 0.1 µg/L, above 0.5 µg/L, or above 1 µg/L. In contrast, conventional cured rubbers activated by zinc stearate exhibit leachate levels above 50 µg/L, or around 75 µg/L.

Furthermore, it is observed that leachable zinc is reduced by a greater percentage than is total zinc, when comparing the current ionomer activated cured compositions to conventional zinc activated compositions. Accordingly, in various embodiments the invention provides a method of decreasing the amount of leachable zinc in proportion to the total zinc in a rubber cured by zinc activation of a sulfur based curing system, by curing a zinc containing rubber composition in the presence of an activator containing a base copolymer containing a plurality of COOH groups, wherein the activator can be zinc containing and is described herein. In an example, the leachable zinc was 74.2 ug/L (micrograms Zn per liter) for a standard zinc stearate activated rubber compound with 15,800 mg/kg of zinc. For the same compound where the activator is based on an ionomer with zinc, the concentration of zinc is 2880 mg/kg. Using proportions, one would expect that the leachable zinc would be ca. 13.5 ug/L for the composition with lower zinc. But the measured leachate zinc was only 4.43 ug/L, or about ⅓ of that "expected" on the basis of the total zinc content. In various embodiments, it is observed that the measured value of leachable zinc is reduced by 50% or more (but not all the way to 100%) compared to that expected or "predicted" based on just a reduction in the overall zinc level in the cured rubber. This is consistent with a model where the zinc is more tightly bound in the cured rubber activated with an ionomer than it is in a conventional rubber activated with a zinc fatty acid soap.

In various embodiments, it is found that the shelf life of compounded rubbers using the zinc activators described herein often increases, so that the compounds can be held for longer periods of time before curing. Advantageously, it is found that physical properties of molded articles with the lower levels of zinc are equivalent to conventionally cured rubber compounds. In various embodiments, it is even observed that the tear strength can be improved. Although the invention is not limited by theory, the improvement in tear strength may be due to the different forms in which zinc is present in the compounded rubbers. Conventionally, ZnO powder is added in large excess to the available stearic acid. Some ZnO powder particles will not react with the stearic acid and remain in the cured rubber compound. These particles can act as stress concentration points and facilitate crack propagation; i.e. tearing. In the present invention, the zinc often is only present in a molecular form as part of an ionomer. In the molecular form, it does not affect crack propagation.

Even though much lower levels of zinc are used in the compositions described herein, it can be observed that activation is improved when compared to a conventional zinc stearate activator. The improved activation is reflected in a lower activation energy measured during cure of the inventive compounds. The lower activation energy means that either less time or a lower temperature is required to effect cure of the compositions.

Although the invention is not limited to theory, it is believed that the active zinc activator complexes described herein sequester zinc or otherwise prevent it from participating in side reactions on the surface of various rubber components such as filler. To illustrate, a typical rubber formula may contain 100 parts of rubber, 0~100 PHR(PHR=parts per 100 parts of rubber) filler, 5 PHR ZnO, 1 PHR stearic acid, 0~25 PHR sulfur, and various other ingredients—accelerators, retarders, process oil, anti-oxidants, and so forth. Of note is that the mass ratio of ZnO to stearic acid is generally high, as much as about 5:1. Assume 5 grams of ZnO to one gram of stearic acid and using their respective formula weights, it is easy to calculate the molar excess of ZnO (see Table I below, where $Zn(StA)_2$ represents zinc stearate).

TABLE I

Calculation of ZnO to stearic acid molar excess.

| Components | Formula Wt (g/mole) | | | |
|---|---|---|---|---|
| ZnO | 81.4 | | | |
| Stearic Acid | 285.4 | | | |
| $Zn(StA)_2$ | 632.3 | | | |

| ZnO PHR | mmoles ZnO | Mmoles StA | mmoles ZnO required | Excess mmoles ZnO |
|---|---|---|---|---|
| 5.00 | 61.43 | 3.50 | 1.75 | 59.67 |

In conventional zinc stearate activation, the Zn is believed to be depleted in a side reaction. Zn stearate is believed to be able to react with hydroxyl groups on the surface of a filler, such as precipitated silica. At the first stage of the reaction, one stearic acid molecule is generated and Zn binds to one surface hydroxyl. Provided there is more ZnO, another stearic acid molecule is liberated, and the Zn then binds to two surface oxygen atoms.

The cessation of the above reaction scheme upon depletion of ZnO has been shown via FTIR, where the species with Zn bound to only one stearic acid and a surface hydroxyl is only resolved via FTIR as the concentration of Zn stearate approaches zero. This suggests that the reaction to deplete Zn and regenerate stearic acid is very fast. To avoid any issues with insufficient activation of the cure, ZnO is traditionally added in large stoichiometric excess to stearic acid. Thus, in conventional zinc stearate activation, a large molar excess of zinc to stearic acid is required to overcome this step of contamination of the filler, which essentially depletes zinc for use in activation.

Regarding the zinc activator complexes described herein, it is believed that the carboxylate groups on the carboxylic based copolymers sequester the zinc and protect it from such reaction with surface hydroxyls of the filler. For this reason, the zinc is not depleted during blending and curing of rubber compositions and can be provided at much lower levels. As seen in the example, conventional zinc stearate is used in compositions where the ZnO concentration is on the order of 3 to 5 PHR. As further demonstrated in the examples, suitable rubber compositions and cured articles can be made within the equivalent concentration of ZnO in the compositions is 0.25 PHR or lower. At the lowest levels, this equates to more than a 90% reduction in zinc in the compositions. While a typical sulfur cured rubber contains on the order of 1.6 to 4% or 1.6 to 3.2% or about 1.7 to 2.3% elemental zinc, compositions of the invention containing the zinc ionomer activators can typically contain about 0.01 to 0.5% or about 0.04 to 0.4% elemental zinc, in a non-limiting example, where all percentages of elemental zinc are percent by weight of the cured composition.

In contrast to conventional curing, when ZnO is provided in molar excess relative to the stearic acid to provide useful zinc soaps for activation, the zinc activator components of the invention actually contain a deficit of $Zn^{+2}$ to carboxyl groups. Despite this molar deficit of $Zn^{+2}$, the reaction on the silica surface cannot be observed by FTIR. While the invention is not limited by any theory, it is proposed that the zinc may be tightly bound with the carboxylic groups. In some polymer systems, the zinc carboxylates are believed to form ionic clusters similar to the zinc ionomers, such as the Surlyn® products. In maleic anhydride copolymers or graft copolymers, a maleic anhydride ring opens to form two carboxylic acids, which react with ZnO to form ionic clusters similar to ionomers.

Curing of the moldable rubber compositions to provide molded articles is carried out by conventional means. Normally, a moldable rubber composition is introduced into a mold, where it is subjected to conditions of curing temperature and pressure for a time sufficient to develop the properties of the cured article. As is conventional, the curing is characterized by parameters Ts2 and T90. These parameters are measured according to known methods by measuring the torque of an oscillated rubber disk while it is being cured. The time for development of 90% of the final torque is referred to as T90. The parameter Ts2 is a measure of how fast the cure develops and is called a measure of "scorch." In various embodiments, cured rubber compositions are characterized by cure under conditions where cure proceeds for a time equivalent to T90 or to T90 plus one minute. In this way, a cured rubber is cured to a stage at which, if measured by a rheometer, at least 90% of the total increase in torque from the uncured to the fully cured stated occurred or would have occurred due to the curing conditions imposed thereon.

It is observed that with moldable rubber compositions containing the zinc ionomer activators described herein, cure is activated equivalently or better than conventional zinc stearate activators, even at lower and sometimes much lower relative contents of Zn. A measure of the improved cure can be demonstrated by calculating an activation energy for the system. An activation energy is calculated according to conventional methods by measuring a cure parameter at different temperatures and calculating the activation energy from an Arrhenius plot. It is convenient to use Ts2 as the cure parameter in calculating the activation energy. For a typical ZnO/stearic acid activated system, the activation energy $E_{act}$ is measured to be about 89 kJ/mol.

Because of the improved cure as reflected in the calculations of activation energy, a lower temperature can be used to effect the cure, thus saving energy, or time can be saved at standard cure temperature.

Shaped articles made by curing the moldable rubber compositions take a number of forms such as shoe outsoles, tires, and the like. The cured articles are characterized by containing a sulfur crosslinked rubber resin (detectable by for example infrared spectroscopy and measurement of elastomeric properties of the cured article) and in addition a polymer with a plurality of zinc carboxylate groups. Presence of the latter can be confirmed or detected with spectroscopic methods and/or elemental analyses. Advantageously, the cured articles have sufficiently cured rubber, but contain less zinc than is conventional for zinc stearate activated rubbers. In various embodiments, the elemental zinc level is 0.01-1% by weight or 0.01 to 0.5% by weight. In various embodiments, the shaped articles are characterized by total zinc content of 0.05-1% or 0.05-0.5% or 0.05-0.3%, with all percentages by weight. In still other embodiments, the total zinc content is about 0.1-1%, 0.1-0.5%, or 0.1-0.3% by weight of elemental zinc. Elemental zinc in the moldable compositions and cured articles can be detected and quantified by conventional methods such as atomic absorption spectroscopy and x-ray fluorescence.

The shaped articles are believed to contain the polymer with a plurality of zinc carboxylate groups by virtue of the activator complex being included in the moldable rubber composition from which the cured article is made. That is, the copolymer component of the activator does not undergo significant chemical transformation during cure, and the zinc present in the starting moldable rubber composition remains in the shaped articles after cure. Since the action of the activator is believed to be at least in part catalytic, i.e. participating in the reaction but not being consumed or changed, the zinc carboxylate groups of the activator complex are believed to be present in the shaped articles. Such groups can be detected by infrared spectroscopy.

It is well known that $Zn(C_{18}H_{35}O_2^-)_2$ (zinc stearate) has a strong peak at 1536 cm$^{-1}$ in the IR spectrum due to asymmetric stretching of $CO_2^-$. Other low molecular weight zinc esters, such as zinc dimethacrylate have this same peak. For the ionomers described herein, this peak is not apparent.

In neat ionomers partially neutralized with zinc, there is a peak at 1466 cm$^{-1}$. For the compounded rubber samples of the present invention, this peak is resolved around 1468~1471 cm$^{-1}$. In some embodiments when the ionomer is made in situ, this peak is not seen in the uncured rubber, but is observed in the cured rubber, thus indicating its in situ formation. Another interesting observation is that in the partially neutralized ionomers, the zinc can be partially extracted from the ionic clusters by the addition of stearic acid to the compound. Partial extraction is evidenced by peaks at both 1536 cm$^{-1}$ (zinc stearate) and 1470 cm$^{-1}$ (zinc ionomer). In the above sample containing stearic acid, there was a small peak at 1596 cm$^{-1}$ which is evidence of reaction of zinc stearate at the silica surface.

EXAMPLES

The following examples will show how a partially neutralized ethylene methacrylic acid polymer activates cure when the neutralizing ion is zinc.

The following compounds are listed in examples.

In the tables below Surlyn 9910 is a terpolymer of ethylene, acrylic ester, and maleic anhydride, partially neutralized with zinc, available from DuPont.

Surlyn 8940 is an ionomer partially neutralized with sodium available from DuPont.

NBR-Styrene is an acrylonitrile-butadiene-styrene terpolymer rubber.

BR is butadiene rubber.

BHT is butylated hydroxyl toluene

PEG is polyethylene glycol.

Silane is a silane coupling agent.

Example 1

TABLE 1

| Component | 1A PHR | 1B PHR | 1C PHR | 1D PHR | 1E PHR | Component | 1F PHR |
|---|---|---|---|---|---|---|---|
| Surlyn 9910 | 0 | 2 | 5 | 10 | 20 | Surlyn 8940 | 20 |
| NBR-Styrene | 6.25 | 6.125 | 5.9375 | 5.625 | 5 | NBR-Styrene | 5 |
| BR | 93.75 | 91.875 | 89.0625 | 84.375 | 75 | BR | 75 |
| Process aid | 1 | 1 | 1 | 1 | 1 | Process aid | 1 |
| Black pigment | 2 | 2 | 2 | 2 | 2 | Black pigment | 2 |
| Silica | 50 | 50 | 50 | 50 | 50 | Silica | 50 |

TABLE 1-continued

| Component | 1A PHR | 1B PHR | 1C PHR | 1D PHR | 1E PHR | Component | 1F PHR |
|---|---|---|---|---|---|---|---|
| Soybean-oil | 2 | 2 | 2 | 2 | 2 | Soybean-oil | 2 |
| Silane | 0.5 | 0.5 | 0.5 | 0.5 | 0.5 | Silane | 0.5 |
| BHT | 1 | 1 | 1 | 1 | 1 | BHT | 1 |
| Wax | 0.5 | 0.5 | 0.5 | 0.5 | 0.5 | Wax | 0.5 |
| PEG | 2.5 | 2.5 | 2.5 | 2.5 | 2.5 | PEG | 2.5 |
| Process aid | 1 | 1 | 1 | 1 | 1 | Process aid | 1 |
| <<<<<CURATIVE PACKAGE>>>>> | | | | | | | |
| TBzTD | 0.21 | 0.21 | 0.21 | 0.21 | 0.21 | TBzTD | 0.21 |
| MBTS | 0.6 | 0.6 | 0.6 | 0.6 | 0.6 | MBTS | 0.6 |
| Sulfur | 2.21 | 2.21 | 2.21 | 2.21 | 2.21 | Sulfur | 2.21 |
| (below is for information and is not an additional ingredient to the formulas) | | | | | | | |
| Percent elemental zinc | 0.0 | 0.04 | 0.10 | 0.19 | 0.39 | | 0.0 |

Approximately 3 kg batches of the formulae given in Table 1 were mixed in a laboratory kneader. The compound was allowed to cool for at least four hours prior to addition of a curative package (TBzTD, MBTS, sulfur/SU135) on an open mill. The compound is allowed to "mature" for one day, then is pressed into slabs for physical testing. The typical pressing conditions are 120 to 220° C. for a time equivalent to a cure of >T90 on a Rheometer. This means that >90% of the increase in torque due to crosslinking of the rubber has occurred. The pressing process creates a cured rubber.

One test to determine if the cure has been activated is a rheometer. This test measures the change in torque of a sample as it cures at a specified temperature. This equates to a cure time. For example, once 90% of the increase in torque has occurred (T90), then the cure time can be set for the temperature of the test. For the present studies, the cure time is T90+1 minutes. Another time that is recorded is Ts2. This is referred to as the time to "scorch". It indicates the onset of curing reactions.

Figure 1:
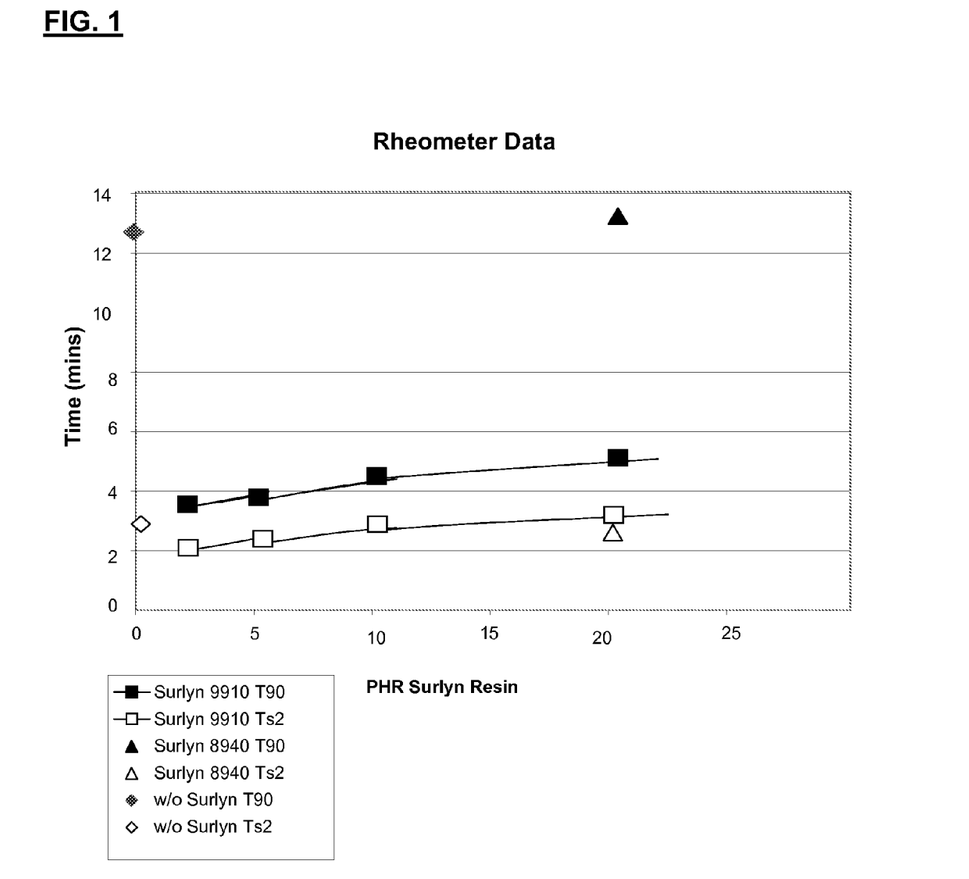
FIGS. 1 and 2 show cure parameters of compositions of the invention.

If the sample is insufficiently activated, then the cure time will be longer. In FIG. 1, the cure times (Ts2 and T90) for the above examples 1A~1F are depicted. As can be seen, when there is no Surlyn 9910 (Example A), then the cure does not activate well, and T90 is >12 minutes. With just 2 PHR of Surlyn 9910 (Example B) the cure is well activated, and T90 is <3.5 minutes. As the Surlyn 9910 content increases to 20 PHR, the cure is still well activated with T90~5.1 minutes. By way of comparison, typical cure times for an analogous formula activated with 3.5 PHR ZnO (equal to 1.7% elemental zinc based on the total formula weight) and 1 PHR stearic acid are: Ts2, 1.33~1.88 minutes and T90, 4.32~5.38 minutes. It appears that the Surlyn 9910 is less "scorchy" (longer Ts2) while still activating the cure in a reasonable time. Being less "scorchy" is a positive attribute, since it makes processing easier, and indicates an increased shelf life for the compounded rubber.

If the Surlyn 8940 resin is used, T90 appears similar to the compound without any Surlyn. This is quite easily explained, as the Surlyn 9910 is partially neutralized with zinc and the Surlyn 8940 is partially neutralized with sodium. Sodium carboxylate compounds are ineffective at activating the cure.

Typically, a sulfur-cured rubber compound will contain 1.7~2.3% elemental zinc (2.1~2.9% ZnO). As shown in the last row of Table 1, the above compounds with Surlyn 9910 contain 0.04~0.39% elemental zinc (based on 2~20 PHR of Surlyn, respectively). At the lowest levels, this equates to a greater than 97% reduction in elemental zinc.

In zinc stearate activated rubbers with silica fillers, when the amount of $Zn^{+2}$ relative to carboxyl groups ($-COO^{-1}$) approaches a stoichiometric ratio or when there is a deficit of $Zn^{+2}$, then a ~Si—O—Zn—COO—R group is observed on the surface of the filler. For the moldable compositions described herein on the other hand, even though there is a deficit of $Zn^{+2}$ to carboxyl groups in the ionomers, the reaction on the silica surface is not apparent via FTIR. Although not being bound by theory, it is proposed that the zinc carboxylates within the ionomer are sterically hindered or insufficiently mobile to react with the silica hydroxyls. This allows one to reduce the amount of zinc to a very low level and still activate the cure. This theory of steric hindrance agrees with the longer Ts2 in the ionomer systems when compared to the traditional ZnO/stearic acid activated systems, which should be quite mobile within the rubber compound.

Another way to show activation is by calculating the activation energy via an Arrhenius plot. This can most easily be accomplished by measuring Ts2 at different temperatures.

TABLE 2

| Component | 1G PHR | 1H PHR | 1I PHR | 1J PHR | 1K PHR | 1L PHR |
|---|---|---|---|---|---|---|
| NBR | 20 | 20 | 20 | 20 | 20 | 20 |
| NBR-Styrene | 5 | 5 | 5 | 5 | 5 | 5 |
| BR | 75 | 75 | 75 | 75 | 75 | 75 |
| Process aid | 0.75 | 0.75 | 0.75 | 0.75 | 0.75 | 0.75 |
| Silica | 50 | 50 | 50 | 50 | 50 | 50 |
| Soybean-oil | 2 | 2 | 2 | 2 | 2 | 2 |
| BHT | 1 | 1 | 1 | 1 | 1 | 1 |
| WAX | 0.5 | 0.5 | 0.5 | 0.5 | 0.5 | 0.5 |
| PEG | 2.5 | 2.5 | 2.5 | 2.5 | 2.5 | 2.5 |
| Process aid | 1 | 1 | 1 | 1 | 1 | 1 |
| ZnO | | 3.5 | | | | |
| Stearic Acid | | 1 | | | | |
| Surlyn 9910 | | | 3 | 5 | | |
| Surlyn 9020 | | | | | 3 | |
| Surlyn 6320* | | | | | | 3 |
| <<<<<CURATIVE PACKAGE>>>>> | | | | | | |
| TBzTD | 0.21 | 0.21 | 0.21 | 0.21 | 0.21 | 0.21 |
| MBTS | 0.6 | 0.6 | 0.6 | 0.6 | 0.6 | 0.6 |
| Sulfur | 2.21 | 2.21 | 2.21 | 2.21 | 2.21 | 2.21 |
| Activation Energy for Ts2 | | | | | | |
| Eact (kj/mol) | 115 | 88 | 87 | 88 | 88 | 120 |

*$Mg^{+2}$ neutralized ionomer

It is apparent from Table 2 that the Ts2 activation energy for a standard ZnO/stearic acid compound (1H) is essentially equivalent to that for zinc, partially-neutralized ionomer compounds (1I~1K). If the neutralizing ion is $Mg^{+2}$ (1L), then the activation energy is much higher and similar to a compound without the activator (1G). Later, it will be shown that Mg can have a synergistic effect on cure times and activation energies when combined with Zn.

In addition to partially neutralized ionomers, being added to a rubber compound, the precursors can be added and the ionomer generated in situ. DuPont, under the tradename Nucrel, sells the polymeric precursors for ionomers. Looking at the activation energies at the bottom of Table 3, it is again apparent that Zn must be present, since in the compound containing un-neutralized Nucrel (1M) the activation energy is similar to compounds without Zn (compare to Compound 1G, above).

TABLE 3

| | Example | | |
|---|---|---|---|
| | 1M | 1N* | 1O** |
| Component | PHR | PHR | PHR |
| NBR | 20 | 20 | 20 |
| NBR-Styrene | 5 | 5 | 5 |
| BR | 75 | 75 | 75 |
| Process aid | 0.75 | 0.75 | 0.75 |
| Silica | 50 | 50 | 50 |
| Soybean oil | 2 | 2 | 2 |
| BHT | 1 | 1 | 1 |
| WAX | 0.5 | 0.5 | 0.5 |
| PEG | 2.5 | 2.5 | 2.5 |
| Process aid | 1 | 1 | 1 |
| ZnO | | 0.5 | 0.5 |
| Nucrel 0925 | 3 | 3 | 3 |
| <<<CURATIVE PACKAGE>>> | | | |
| TBzTD | 0.21 | 0.21 | 0.21 |
| MBTS | 0.6 | 0.6 | 0.6 |
| Sulfur | 2.21 | 2.21 | 2.21 |
| Activation Energy for Ts2 | | | |
| Eact (kj/mol) | 119 | 88 | 88 |

N* - ZnO added on open mill
O** - ZnO added in Banbury

The ZnO was added in different phases of the compounding. For compound 1N, ZnO was added in the last mixing phase, which proceeds at lower temperature. For Compound 1O, ZnO was added in the early mixing phase, which proceeds at higher temperature. For Compound 1O, it would be expected that the earlier addition would provide a longer time and more favorable (higher) temperatures for reaction between the Nucrel and ZnO. This should lead to better properties in the cured Compound 1O when compared to Compound 1N. Zinc is only 0.24% of the compound weight, which yields a >85% reduction from the typical compound containing 1.7~2.3% zinc.

Table 4 below shows that the modulus is highest for Compound 1O, thus showing superior network development. Also, tensile strength and elongation both increase concurrently with the change in order of addition. This is further indication of superior network formation in Compound 1O, since these parameters normally move conversely to each other; i.e. as tensile strength increases, % elongation decreases and vice versa.

TABLE 4

| | Example | | |
|---|---|---|---|
| | 1M | 1N | 1O |
| 300% mod (kg/cm$^2$) | 41 | 49 | 58 |
| Tensile (kg/cm$^2$) | 153 | 163 | 173 |
| % elongation | 509 | 541 | 583 |
| Tear (kg/cm) | 95 | 98 | 99 |
| Abrasion (cc/loss) | 0.108 | 0.090 | 0.083 |

Another product is the combination of a partially neutralized zinc ionomer with further addition of ZnO. In keeping with the goal to reduce overall Zn contained in the rubber compound, the ZnO is typically added at much lower levels than normally encountered in rubber processing; however, the lower ZnO amount is not a limitation with respect to the current invention.

It was mentioned previously that Mg could have a synergistic effect when combined with Zn. It was shown in example 1L that an $Mg^{+2}$ neutralized ionomer did not appear to activate the cure. However, if MgO is included with an ionomer precursor and ZnO (compare 1P and 1Q in Table 5), or if MgO is added to a $Zn^{+2}$ neutralized ionomer (compare Example 1R and 1S in Table 5), then it has a synergistic effect and lowers the activation energy by 4~5 kj/mol.

TABLE 5

| | Example | | | |
|---|---|---|---|---|
| | 1P | 1Q | 1R | 1S |
| Component | PHR | PHR | PHR | PHR |
| BR | | | 75 | 75 |
| NBR-Styrene | 5.9 | 5.9 | 5 | 5 |
| BR | 89.1 | 89.1 | | |
| ENR-50 | | | 15 | 15 |
| Process aid | 1.5 | 1.5 | 1.5 | 1.5 |
| ZnO | 0.5 | 0.5 | | |
| Black | 2 | 2 | | |
| Silica | 50 | 50 | 45 | 45 |
| Soybean oil | 2 | 2 | 1.5 | 1.5 |
| BHT | 1 | 1 | 1 | 1 |
| WAX | 0.5 | 0.5 | 0.5 | 0.5 |
| PEG | 2.5 | 2.5 | 2.5 | 2.5 |
| Process aid | 1 | 1 | 1 | 1 |
| Surlyn 9910 | | | 5 | 5 |
| Nucrel 0925 | 5 | 5 | | |
| MgO | | 0.5 | | 0.5 |
| <<<CURATIVE PACKAGE>>> | | | | |
| MBTS | 0.6 | 0.6 | 0.6 | 0.6 |
| TBZTD | 0.21 | 0.21 | 0.21 | 0.21 |
| Sulfur | 2.21 | 2.21 | 2.21 | 2.21 |
| Activation Energy for Ts2 | | | | |
| Eact (kj/mol) | 91 | 87 | 97 | 92 |

Figure 2:
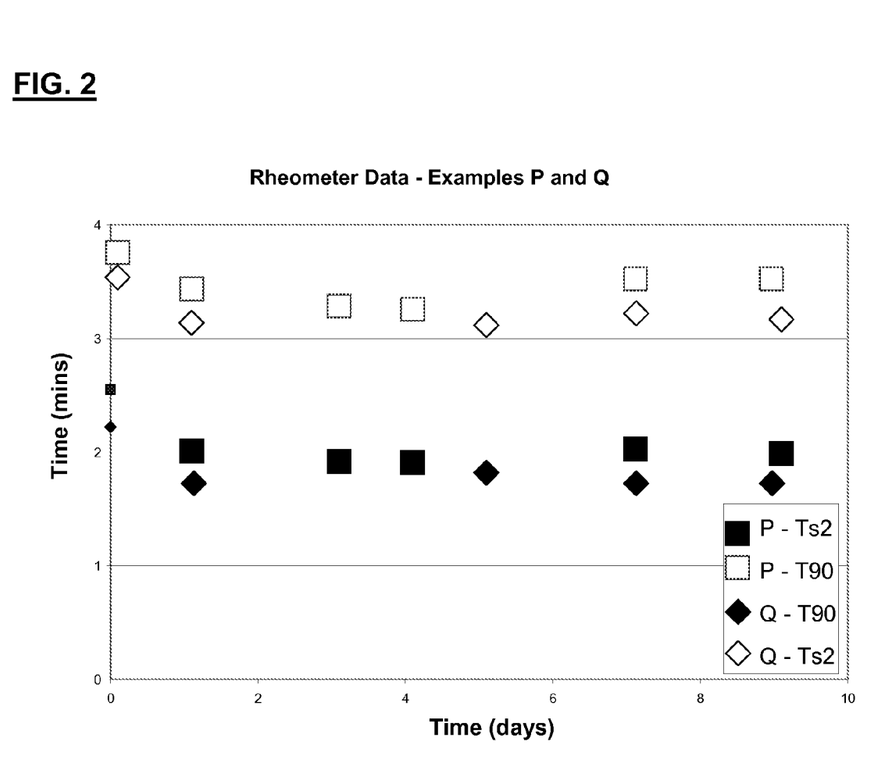

Activation of cure is essential to efficient processing; however, over-activation can lead to poor shelf stability. The above compounds are extremely stable at room temperature as evidenced by their scorch (Ts2) and cure times (T90) plotted over several days in FIG. 2, with the values of Ts2 and T90 remaining constant. In compounds lacking stability, Ts2 and T90 will decrease after several days rendering the compound too crosslinked to be processed. From Table 5 and FIG. 2, it is also apparent that the addition of MgO made the compound cure slightly faster, but the overall shelf stability was maintained.

Example 2

Maleic Anhydride Carboxylic Polymer Activators

In this example, the use of a metal oxide and a fatty acid to activate sulfur cure in rubber compounds has been replaced by the use of a metal oxide or metal oxides and MA (maleic anhydride) containing polymers. In a preferred embodiment, the MA containing polymer is based on a terpolymer of (ethylene-acrylic ester-maleic anhydride). These are commercially available under the tradename Lotader® from Arkema. In another preferred embodiment, the MA containing polymer is based on a maleic anhydride grafted (ethylene-acrylate) copolymer. These are commercially available under the tradename Orevac® from Arkema. Other suppliers exist for these and similar compounds. Generally, any polymer containing maleic anhydride is potentially useful in the present invention.

TABLE 6

| Component | 2-1 PHR | 2-2 PHR | 2-3 PHR | 2-4 PHR | 2-5 PHR | 2-6 PHR |
|---|---|---|---|---|---|---|
| NBR | 20 | 20 | 20 | 20 | 20 | 20 |
| NBR-Styrene | 5 | 5 | 5 | 5 | 5 | 5 |
| BR | 75 | 75 | 75 | 75 | 75 | 75 |
| Process aid | 1.5 | 1.5 | 1.5 | 1.5 | 1.5 | 1.5 |
| Silica | 50 | 50 | 50 | 50 | 50 | 50 |
| Soybean oil | 2 | 2 | 2 | 2 | 2 | 2 |
| Stearic Acid | 1 | | | | | |
| BHT | 1 | 1 | 1 | 1 | 1 | 1 |
| Wax | 0.5 | 0.5 | 0.5 | 0.5 | 0.5 | 0.5 |
| PEG | 2.5 | 2.5 | 2.5 | 2.5 | 2.5 | 2.5 |
| Process Aid | 1 | 1 | 1 | 1 | 1 | 1 |
| Lotader | | 3 | 3 | 3 | 3 | 3 |
| ZnO | 3.5 | 0.5 | 0.25 | | 0.25 | |
| MgO | | | | | 0.5 | 0.5 |
| <<< Curative Package >>> | | | | | | |
| MBTS | 0.6 | 0.6 | 0.6 | 0.6 | 0.6 | 0.6 |
| TBzTD | 0.21 | 0.21 | 0.21 | 0.21 | 0.21 | 0.21 |
| Sulfur | 2.21 | 2.21 | 2.21 | 2.21 | 2.21 | 2.21 |

Table 6 gives the formulations of examples 2-1 through 2-6. The mixing procedure and Rheometer evaluations are carried out as in Example 1.

If the sample is insufficiently activated, then the cure time will be longer. Table 7 contains the cure times (Ts2 and T90) and the physical properties for the above examples. A typical formulation is represented by Example 2-1. It contains 3.5 PHR of ZnO and 1 PHR of stearic acid. In Example 2-2, an MA containing polymer, Lotader®, facilitates a significant reduction in ZnO to 0.5 PHR, with a concomitant improvement in cure time; i.e. T90 is slightly shorter. The physical properties are also acceptable. If the ZnO is reduced to 0.25 PHR, as in Example 2-3, the cure time is longer and the physical properties, though acceptable, are generally less. These results suggest a less developed network structure. If ZnO is totally eliminated from the formula, Example 2-4, then T90 is about two times longer and the Rheometer curve shows a "marching modulus". This sample was not evaluated further.

To Example 2-3, 0.5 PHR of MgO was added (the result is Example 2-5). These two formulas have similar cure and properties, thus, in this case, there is minimal synergism with MgO. Example 2-6 shows a formula with Lotader® and MgO (no ZnO). Its behavior is similar to Lotader® without any metal oxide (Example 2-4), showing that $Mg^{+2}$ without zinc does not appear to provide any benefits with respect to activation. These results parallel those obtained previously with ionomers that were partially neutralized with $Mg^{+2}$.

TABLE 7

| | Example | | | | | |
|---|---|---|---|---|---|---|
| | 2-1 | 2-2 | 2-3 | 2-4 | 2-5 | 2-6 |
| T90 (mins) | 3.82 | 3.40 | 4.27 | 8.10 | 4.35 | 8.12 |
| Ts2 (mins) | 1.77 | 2.00 | 2.65 | 3.38 | 2.72 | 3.50 |
| Hardness (Shore A) | 72.0 | 69.5 | 69.5 | | 68.5 | |
| 300% Modulus (kg/cm$^2$) | 44 | 50 | 41 | | 41 | |
| Tensile (kg/cm$^2$) | 172 | 141 | 119 | | 126 | |
| % Elongation | 653 | 581 | 632 | | 658 | |
| Tear (kg/cm) | 41 | 64 | 81 | | 83 | |
| Abrasion (cc/loss) | 0.071 | 0.051 | 0.139 | | 0.114 | |

Typically, a sulfur-cured rubber compound will contain 1.7~2.3% elemental zinc. The above compounds with a MA containing polymer have 0.12~0.24% elemental zinc. At the lowest levels, this equates to >90% reduction in zinc.

In zinc stearate activated rubber compositions with silica filler, when the amount of $Zn^{+2}$ relative to carboxyl groups ($-CO_2^{-1}$) approaches a stoichiometric ratio or there is a deficit of $Zn^{+2}$, then a ~Si—O—Zn—COO—R group is present on the surface of the silica (where "R" nominally represents a long saturated or partially unsaturated alkyl chain). In the activated compositions of Example 2, on the other hand, even though there is a deficit of $Zn^{+2}$ to carboxyl groups in the above compounds, the reaction on the silica surface is not observed in the FTIR. Not being bound by theory, it is proposed that the maleic anhydride ring opens to form two carboxylic acids. These react with ZnO to form ionic clusters, similar to ionomers. Evidence of the ring opening and ionic clusters can be found in the FTIR. A 1:1 copolymer of styrene and maleic anhydride has two easily resolved peaks in the FTIR due to asymmetric (1850 cm$^{-1}$) and symmetric (1770 cm$^{-1}$) stretching of $-CO_2^{-1}$ in the strained anhydride ring. The second peak is shifted from the normal symmetric stretching at 1735 cm$^{-1}$. Once the reaction with zinc oxide occurs in the cured rubber, the two peaks noted above for the anhydride are not present and a peak at 1735 cm$^{-1}$ appears. Previously, it was noted that a peak at ca. 1469 cm$^{-1}$ was associated with the zinc ionomers, both neat product and compounded rubber where a zinc ionomer was added or it was formed in situ. This peak is apparent in the cured compounds with maleic anhydride containing polymers, indicating in situ formation of a similar structure to zinc ionomers, most likely ionic clusters.

Another way to show activation is by calculating the activation energy via an Arrhenius plot. This can most easily be accomplished by measuring Ts2 at different temperatures. For comparison, a typical ZnO/stearic acid activated system has an $E_{act}$ of about 88 kJ/mol.

In Table 8, the activation energy for several compounds is presented. These results are a significant reduction in activation energy and have noticeably faster cure times; i.e. T90 is reduced. These compounds have the added advantage that a lower temperature could be used to effect the cure, thus saving energy. Alternately, time can be saved at the standard cure temperature.

TABLE 8

| Component | 2-7 PHR | 2-8 PHR | 2-9 PHR | 2-10 PHR | 2-11 PHR | 2-12 PHR |
|---|---|---|---|---|---|---|
| NBR | 10 | 10 | 10 | 10 | 10 | 10 |
| BR | 80 | 80 | 80 | 80 | 80 | 80 |
| NR | 10 | 10 | 10 | | | |
| IR | | | | 10 | 10 | 10 |
| Process aid | 2 | 2 | 2 | 2 | 2 | 2 |
| Silica | 48 | 48 | 48 | 52 | 52 | 52 |
| Soybean oil | 1 | 1 | 1 | 1 | 1 | 1 |
| BHT | 1 | 1 | 1 | 1 | 1 | 1 |
| Wax | 0.5 | 0.5 | 0.5 | 0.5 | 0.5 | 0.5 |
| PEG | 3 | 3 | 3 | 3.5 | 3.5 | 3.5 |
| Process aid | 3 | 3 | 3 | 3 | 3 | 3 |
| Orevac | | | | | | 2 |
| Lotader | 2 | 2 | 2 | 1 | 1 | |
| ZnO | 0.25 | 0.25 | 0.25 | 0.25 | 0.25 | 0.25 |
| MgO | | 0.25 | 0.5 | 0.5 | | |
| <<< Curative Package >>> | | | | | | |
| MBTS | 0.6 | 0.6 | 0.6 | 0.6 | 0.6 | 0.6 |
| TBZTD | 0.18 | 0.18 | 0.18 | 0.18 | 0.18 | 0.18 |
| Sulfur | 1.8 | 1.8 | 1.8 | 2.06 | 2.06 | 1.8 |
| <<< Rheometer data >>> | | | | | | |
| T90 (mins) | 2.48 | 2.62 | 2.63 | 2.47 | 2.55 | 2.37 |
| Ts2 (mins) | 1.65 | 1.65 | 1.67 | 1.47 | 1.53 | 1.45 |
| $E_{act}$(kJ/mol) | 78.1 | 76.4 | 75.7 | 77.2 | 76.7 | 73.4 |
| <<< Physical properties >>> | | | | | | |
| Hardness (Shore A) | 67.5 | 67.5 | 64.5 | 67.5 | 67.5 | 70.5 |
| 300% Mod. (kg/cm$^2$) | 33 | 35 | 37 | 35 | 35 | 41 |
| Tensile (kg/cm$^2$) | 114 | 116 | 109 | 114 | 117 | 139 |
| % Elongation | 706 | 690 | 621 | 695 | 706 | 818 |
| Tear (kg/cm) | 68 | 73 | 68 | 74 | 73 | 75 |
| Abrasion (cc/loss) | 0.337 | 0.257 | 0.321 | 0.195 | 0.171 | 0.141 |

Another useful type of compound is a copolymer of styrene and maleic anhydride. These can be used with low levels of zinc to produce cured rubber components. Like the other maleic anhydride containing polymers, the activation energy is very low. Examples 2-13 through 2-20 in table 10 are illustrative of these copolymers. SMA 1000 is a low molecular weight styrene-maleic anhydride copolymer with an approximately 1:1 mole ratio. SMA 3000 is a low molecular weight styrene-maleic anhydride copolymer with an approximately 3:1 mole ratio of styrene to maleic anhydride. SMA 3840 is a partial monoester of a styrene-maleic anhydride copolymer. SMA EF80 is a low molecular weight styrene-maleic anhydride copolymer with an approximately 8:1 mole ratio of styrene to maleic anhydride. The SMA resins are commercial products sold by Sartomer Company of Exton Pa.

TABLE 10

| Component | 2-13 PHR | 2-14 PHR | 2-15 PHR | 2-16 PHR | 2-17 PHR | 2-18 PHR | 2-19 PHR | 2-20 PHR |
|---|---|---|---|---|---|---|---|---|
| NBR | 10 | 10 | 10 | 10 | 10 | 10 | 10 | 10 |
| BR | 80 | 80 | 80 | 80 | 80 | 80 | 80 | 80 |
| NR | 10 | 10 | 10 | 10 | 10 | 10 | 10 | 10 |
| Process aid | 2 | 2 | 2 | 2 | 2 | 2 | 2 | 2 |
| Silica | 48 | 48 | 48 | 48 | 48 | 48 | 48 | 48 |
| Soybean oil | 1 | 1 | 1 | 1 | 1 | 1 | 1 | 1 |
| BHT | 1 | 1 | 1 | 1 | 1 | 1 | 1 | 1 |
| Wax | 0.5 | 0.5 | 0.5 | 0.5 | 0.5 | 0.5 | 0.5 | 0.5 |
| PEG | 3 | 3 | 3 | 3 | 3 | 3 | 3 | 3 |
| Process aid | 3 | 3 | 3 | 3 | 3 | 3 | 3 | 3 |
| SMA1000 | 2 | 2 | | | | | | |
| SMA3000 | | | 2 | 2 | | | | |
| SMA3840 | | | | | 2 | 2 | | |
| SMA EF80 | | | | | | | 2 | 2 |
| ZnO | 0.25 | 0.25 | 0.25 | 0.25 | 0.25 | 0.25 | 0.25 | 0.25 |
| <<< Curative Package >>> | | | | | | | | |
| MBTS | 0.6 | | 0.6 | | 0.6 | | 0.6 | |
| Sulfur donor* | | 0.6 | | 0.6 | | 0.6 | | 0.6 |
| TBzTD | 0.18 | 0.18 | 0.18 | 0.18 | 0.18 | 0.18 | 0.18 | 0.18 |
| Sulfur | 1.8 | 1.8 | 1.8 | 1.8 | 1.8 | 1.8 | 1.8 | 1.8 |

*diisopropyl xanthogen polysulphide

The mixing procedure and Rheometer evaluations are as previously described. Physical and chemical properties are given in Table 11.

TABLE 11

| | Example | | | | | | | |
|---|---|---|---|---|---|---|---|---|
| | 2-13 | 2-14 | 2-15 | 2-16 | 2-17 | 2-18 | 2-19 | 2-20 |
| $E_{act\ (kJ/mol)}$ | 80 | 75.5 | 77.6 | 73.2 | 83.7 | 77.5 | 80.4 | 73.4 |
| Hardness (Shore A) | 67.5 | 67.5 | 69 | 69 | 67.5 | 67.5 | 64.5 | 67.5 |
| 300% mod. (kg/cm$^2$) | 35 | 35 | 39 | 39 | 34 | 33 | 27 | 30 |
| Tensile (kg/cm$^2$) | 116 | 108 | 123 | 120 | 109 | 105 | 96 | 110 |
| % Elongation | 730 | 695 | 738 | 708 | 732 | 715 | 761 | 748 |
| Tear (kg/cm) | 72 | 63 | 74 | 69 | 74 | 65 | 71 | 73 |
| Abrasion (cc/loss) | 0.158 | 0.172 | 0.13 | 0.133 | 0.229 | 0.23 | 0.324 | 0.26 |

The compounds have generally acceptable properties, but the ones with a higher concentration of maleic anhydride to styrene tend to give better properties. (compare 2-13, a 1:1 ratio to 2-19 a 1/8:1 ratio).

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A cured molded rubber article comprising:
   sulfur crosslinked rubber;
   1-25 phr of a zinc ionomer; and
   a filler selected from the group consisting of silica and carbon black wherein the article comprises 0.01-0.5% by weight Zn.

2. A cured molded rubber article according to claim 1, wherein the zinc ionomer comprises a partially zinc neutralized copolymer of styrene and maleic anhydride.

3. A cured molded rubber article according to claim 2, wherein the styrene maleic anhydride copolymer is partially esterified.

4. A cured molded rubber article according to claim 1, wherein the activator component comprises a zinc neutralized copolymer of maleic anhydride.

5. A cured molded rubber article according to claim 1, comprising a partially zinc neutralized graft copolymer of maleic anhydride.

6. A cured molded rubber article according to claim 1, characterized by cure for a time equivalent to at least T90.

7. A cured molded rubber article according to claim 1 characterized by cure for a time equivalent to at least T90 plus 1 minute.

8. A cured molded rubber article according to claim 1, wherein the zinc ionomer comprises a partially zinc-neutralized copolymer of ethylene and acrylic acid or a partially zinc neutralized copolymer of ethylene and methacrylic acid.

9. A molded article according to claim 1, wherein the filler is silica and the article is in the form of a rubber outsole.

10. A sulfur cured rubber containing 0.01-0.5% by weight zinc, and characterized by a non-zero measured value of zinc leachate concentration that is less than 20 µg/L determined by ICP after leaching according to EPA test method 1312 using a pH 4.2 extracting solution.

11. A cured rubber according to claim 10, wherein the zinc leachate concentration is less than 10 µg/L.

12. A cured rubber according to claim 10, comprising silica filler.

13. A cured rubber according to claim 10, characterized by cure for a time equivalent to at least T90.

14. A cured rubber according to claim 10, characterized by cure for a time equivalent to at least T90 plus one minute.

* * * * *